(12) United States Patent
Peri et al.

(10) Patent No.: US 7,533,232 B2
(45) Date of Patent: May 12, 2009

(54) ACCESSING DATA FROM DIFFERENT MEMORY LOCATIONS IN THE SAME CYCLE

(75) Inventors: Ramesh V. Peri, Austin, TX (US); John S. Fernando, Austin, TX (US); Ravi Kolagotla, Austin, TX (US); Srinivas P. Doddapaneni, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 691 days.

(21) Appl. No.: 10/717,085

(22) Filed: Nov. 19, 2003

(65) Prior Publication Data

US 2005/0108493 A1  May 19, 2005

(51) Int. Cl.
*G06F 12/06* (2006.01)
(52) U.S. Cl. ........................ 711/168; 711/150
(58) Field of Classification Search .......... 711/128, 711/130, 131, 133, 150, 168, 148, 167, 218, 711/100
See application file for complete search history.

(56) References Cited

U.S. PATENT DOCUMENTS

| | | | | |
|---|---|---|---|---|
| 5,247,649 A | * | 9/1993 | Bandoh | 711/130 |
| 5,274,790 A | * | 12/1993 | Suzuki | 711/133 |
| 5,557,768 A | * | 9/1996 | Braceras et al. | 711/131 |
| 5,742,790 A | * | 4/1998 | Kawasaki | 711/128 |
| 5,958,038 A | * | 9/1999 | Agrawal et al. | 711/100 |
| 5,983,328 A | * | 11/1999 | Potts et al. | 711/157 |
| 6,629,206 B1 | * | 9/2003 | Johnson | 711/123 |
| 6,728,856 B2 | * | 4/2004 | Grosbach et al. | 711/202 |
| 6,928,525 B1 | * | 8/2005 | Ebner et al. | 711/150 |
| 2002/0188813 A1 | * | 12/2002 | Cheung et al. | 711/154 |

* cited by examiner

*Primary Examiner*—Pierre-Michel Bataille
(74) *Attorney, Agent, or Firm*—Trop, Pruner & Hu, P.C.

(57) ABSTRACT

In a modified Harvard architecture, conventionally, read operations in the same cycle are only implemented when different memory banks are to be accessed by the different read operation. However, when different sublines in the same memory bank are being accessed, cycles may be saved by accessing both sublines in the same cycle.

28 Claims, 4 Drawing Sheets

ACCESSING DATA FROM DIFFERENT MEMORY LOCATIONS IN THE SAME CYCLE

BACKGROUND

This invention relates generally to digital signal processors.

A digital signal processor is an integrated circuit designed for high speed data manipulation. Digital signal processors may be used in audio, communications, image manipulation, and other data acquisition and data control applications.

Digital signal processors may use a modified Harvard architecture with dual ported memory where two data address buses are used to fetch data items from two different vectors located in memory at the same time. By accessing two data items at the same time, the computation units may be continuously fed with data. Dual ported memory is typically implemented using several banks of single ported memory. In such implementations, two data fetches may be done in one cycle when the data that must be accessed are in different memory banks that may be accessed at the same time.

As a result, when the data to be accessed is in the same memory bank, then this parallel processing is not possible. As a result, extra cycles may be required.

Thus, there is a need for better ways to access data in digital signal processing.

DETAILED DESCRIPTION

Figure 1:
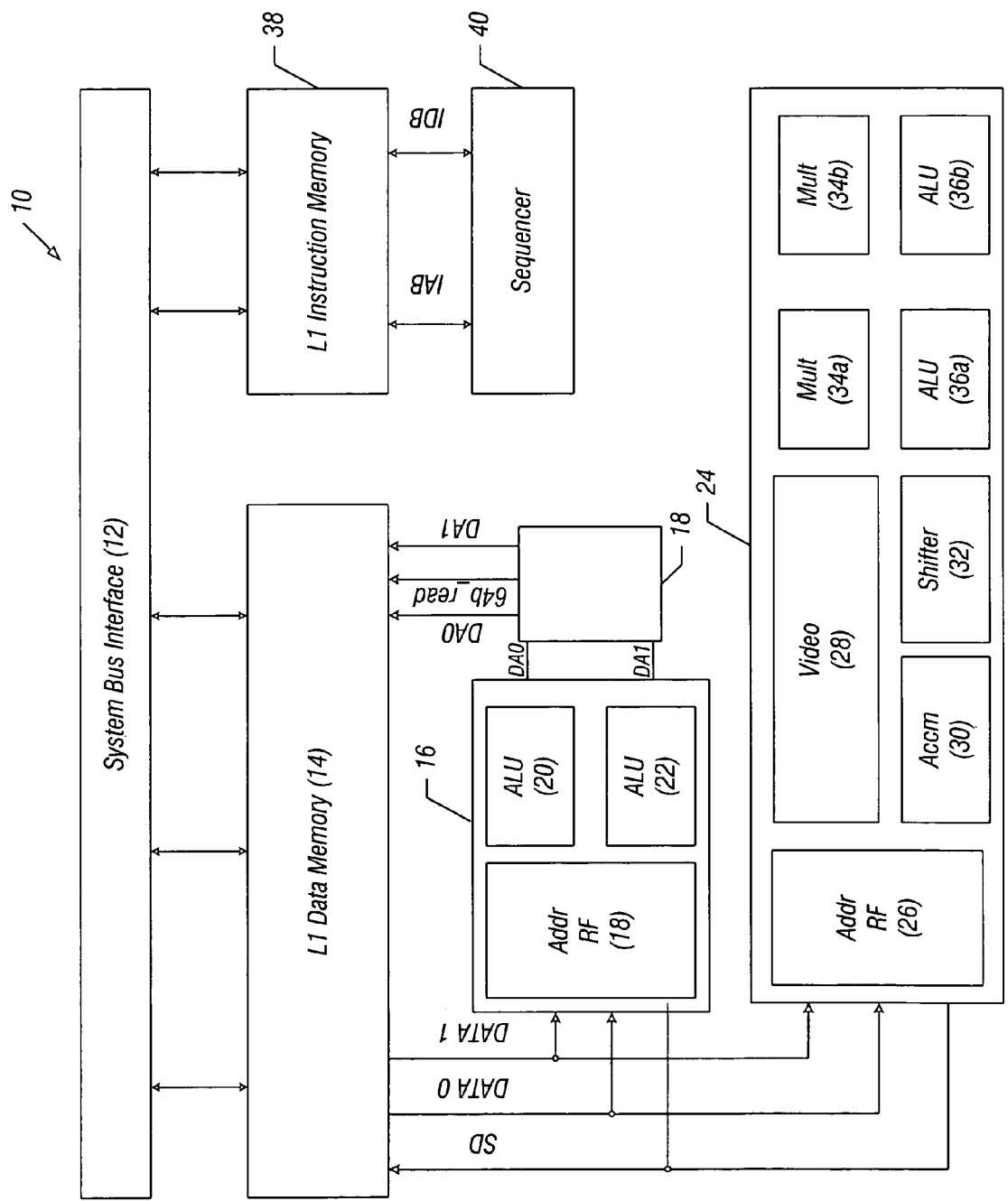
FIG. 1 is an architectural level view of a digital signal processor in accordance with one embodiment of the present invention.

Referring to FIG. 1, a digital signal processor 10 may include a system bus interface 12 coupled to an L1 data memory 14. The memory 14 may include ports coupled to the buses data 0 and data 1 which carry data back to a core 24. In a modified Harvard architecture, parallel memory accesses may be achieved using the buses DA0 and DA1 when data in different memory banks are targeted for data sought by the core 24.

The digital signal processor core 24 may have an address interface 26, a video processing unit 28, an accumulator 30, a shifter 32, a multiplier 34*a*, a multiplier 34*b*, and a pair of arithmetic logic units 36. The system bus interface 12 may also be coupled to an L1 instruction memory 38 which operates with a sequencer 40.

A memory controller 16 may include an address interface 18 and a pair of arithmetic logic units 20 and 22. The controller 16 receives the signals on LD0 and LD1 buses which provide data to the core 24. The controller 16 outputs addresses on the data buses DA0 and DA1. When different memory banks in the memory 14 are addressed by the core 24, the separate DA0 and DA1 buses may be utilized to address two locations at the same time in the same cycle.

Moreover, a controller 18 may be provided on the output of the controller 16 (or as part of the controller 16) between the data buses DA0 and DA1. The controller 18 may compare the addresses on buses DA0 and DA1 to see if they are directed to access the same memory subline. For example, a subline may be 64 bits while a line is 256 bits in one embodiment. If the targeted data is in the same subline, then a 64 bit read from the same or different 32 bit segments in the same subline may be implemented in the same cycle. The 64 bit read may be accomplished from the same subline at the same time, even though each of these accesses target the same memory bank.

Figure 2:
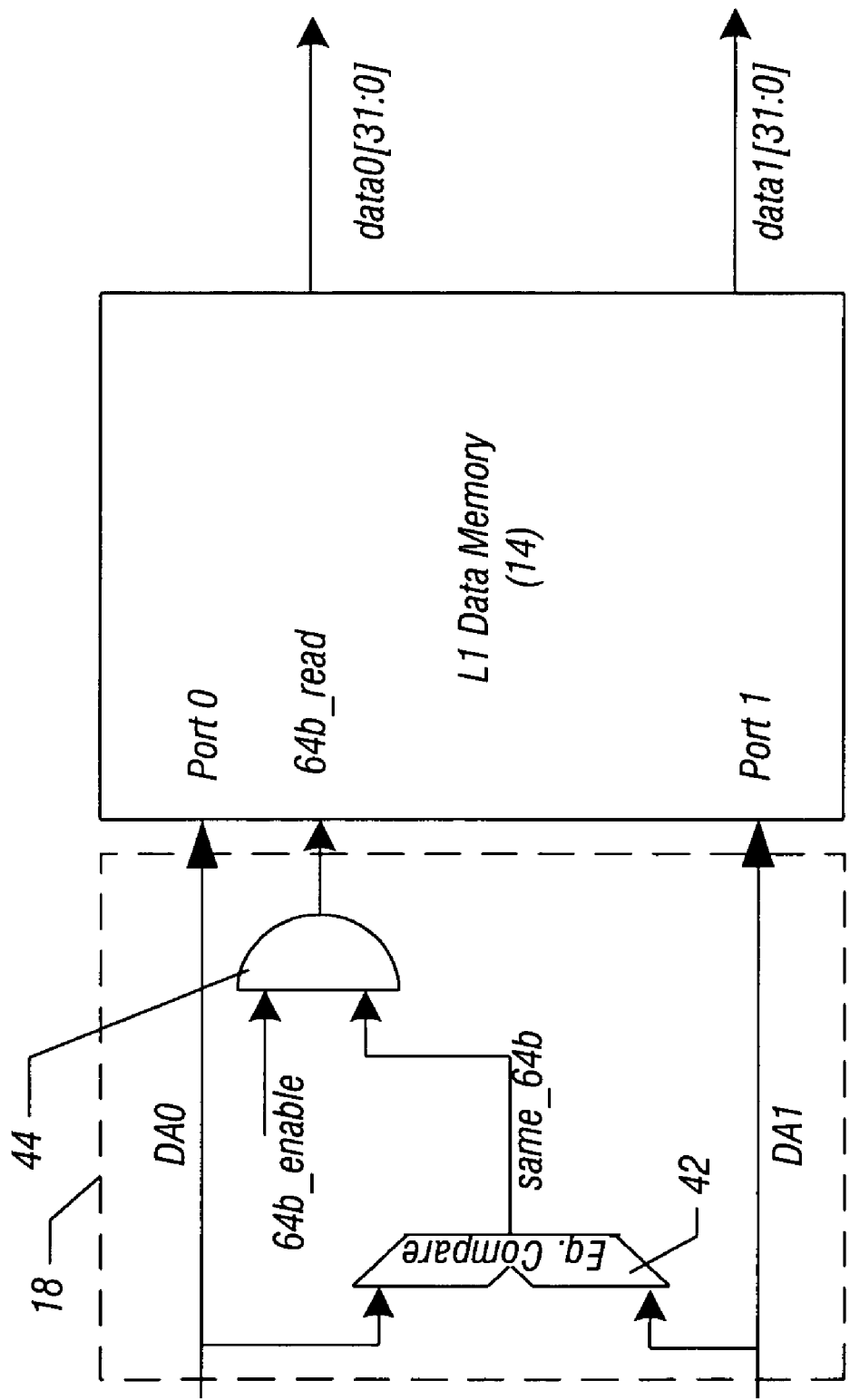
FIG. 2 is a more detailed depiction of a portion of the embodiment shown in FIG. 1 in accordance with one embodiment of the present invention.

The controller 18, in one embodiment, may include a comparator 42 that compares the addresses on the DA0 and DA1 buses as shown in FIG. 2. If the same 64 bit subline is being addressed, and if 64 bit addressing is enabled (64*b*_enabled), then the output of the AND gate 44 is provided to the 64 bit read port in the L1 data memory 14. The 64 bit read port is simply the combination of the conventional ports 0 and 1 of a modified Harvard architecture. The ports 0 and 1 are used to address two locations in different memory banks in the memory 14 in the same cycle.

Different 32 bit segments of the same subline may be read at the same time in the same cycle when a signal is received by the 64 bit read port. A first 32 bit data output from the data memory 14 may be sent on data 0 and the other 32 bit data output may be provided on data 1. However, if each access is directed to the same 32 bit segment of the same subline, that same 32 bit segment may be provided on both data 0 and data 1.

Even in situations where the same memory bank is being accessed, it is possible nonetheless to do the read in the same cycle. Under the modified Harvard architecture this is not possible. As a result, the number of cycles that are utilized over a large number of read operations may be reduced in some embodiments of the present invention. In some embodiments, this improvement may be completely transparent to the instruction set architecture. However, the programmer can take advantage of this capability to get vector-like performance from traditional microprocessors.

Figure 3:
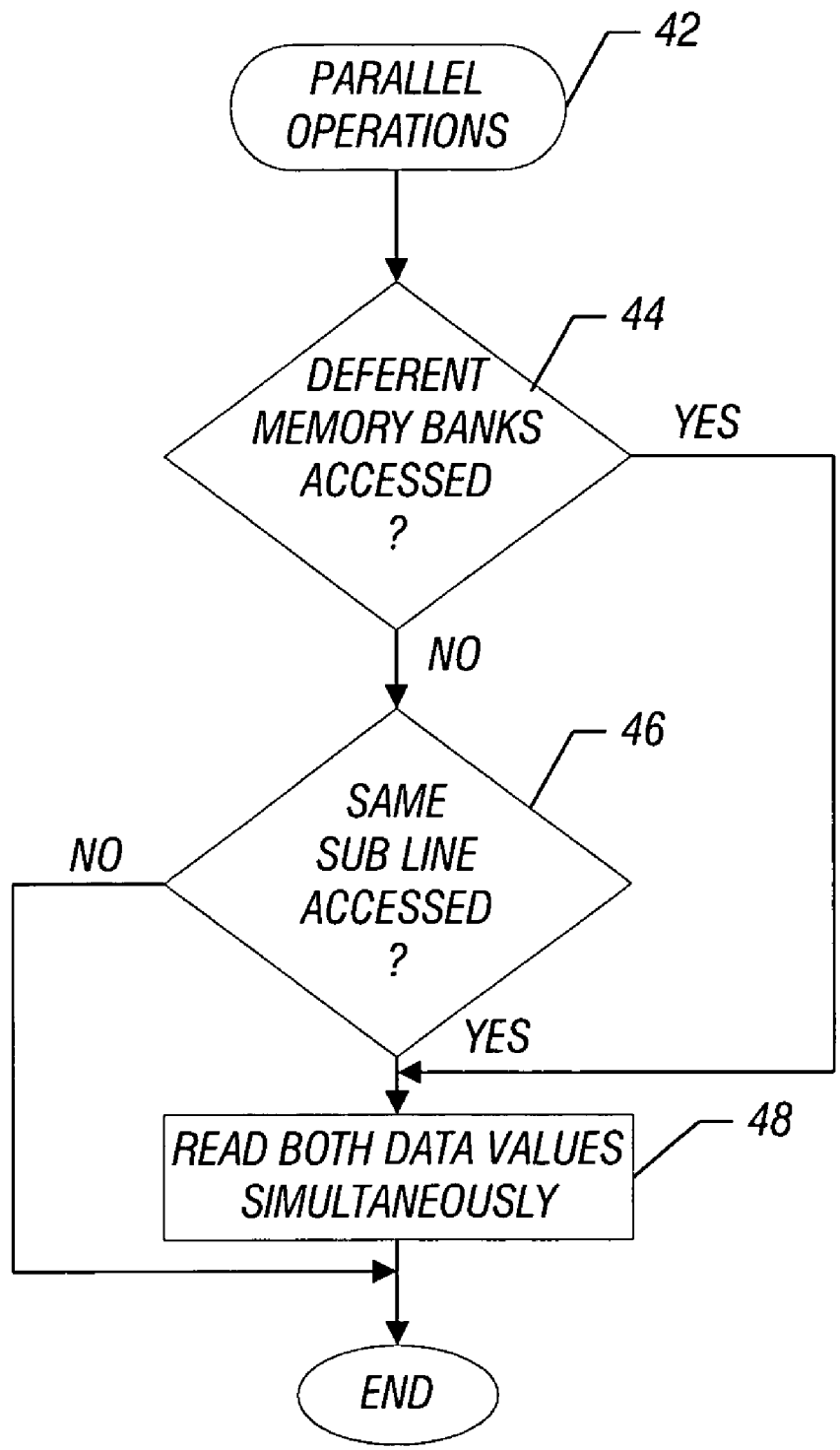
FIG. 3 is a flow chart for one embodiment of the present invention.

While a hardware implementation is illustrated, a flow chart, shown in FIG. 3, illustrates the operation of the hardware and further provides an illustration of a software based approach. In a software based approach, the code may be stored in a processor-based controller 18, as one example, or the core 24, as another example.

In any case, an initial check at diamond 44 determines whether different memory banks are being accessed. If so, parallel read operations may be done to save cycles as indicated in block 48. However, even if different memory banks are not accessed, as determined in diamond 44, if the same subline would be accessed, as determined in diamond 46, the operation can proceed to read both segments in the same cycle.

Figure 4:
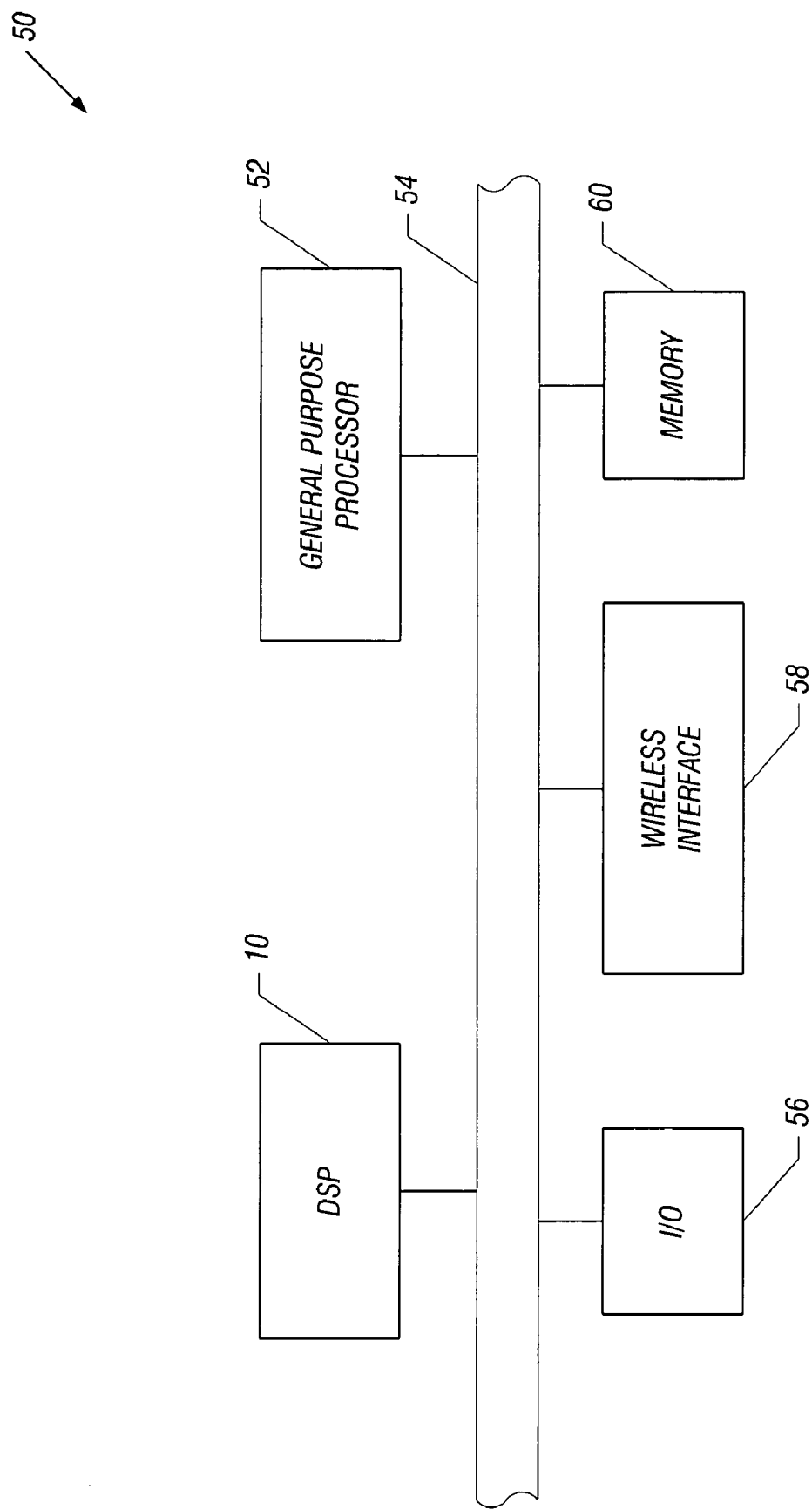
FIG. 4 is a schematic system depiction of one embodiment of the present invention.

Turning to FIG. 4, a portion of a system 50 in accordance with an embodiment of the present invention is described. The system 50 may be used in wireless devices such as, for example, a personal digital assistant (PDA), a laptop or portable computer with wireless capability, a web tablet, a wireless telephone, a pager, an instant messaging device, a digital music player, a digital camera, or other devices that may be adapted to transmit and/or receive information wirelessly. System 50 may be used in any of the following systems: a wireless local area network (WLAN) system, a wireless personal area network (WPAN) system, or a cellular network, although the scope of the present invention is not limited in this respect.

System 50 may include the digital signal processor 10, a general purpose processor 56, an input/output (I/O) device 56 (e.g. a keypad, display), a memory 60, and a wireless interface 58 and, coupled to each other via, a bus 54. It should be noted that the scope of the present invention is not limited to embodiments having any or all of these components.

The general purpose processor 52 may comprise, for example, one or more microprocessors, micro-controllers, or the like. Memory 60 may be used to store messages transmitted to or by system 50. Memory 60 may also optionally be used to store instructions that are executed by the processors 10 and 52 during the operation of system 50, and may be used to store user data. Memory 60 may be provided by one or more different types of memory. For example, memory 60 may comprise a volatile memory (any type of random access memory) or a non-volatile memory such as a flash memory.

The I/O device 56 may be used to generate a message. The system 50 may use the wireless interface 58 to transmit and receive messages to and from a wireless communication network with a radio frequency (RF) signal. Examples of the wireless interface 58 may include an antenna, or a wireless transceiver, such as a dipole antenna, although the scope of the present invention is not limited in this respect. Also, the I/O device 56 may deliver a voltage reflecting what is stored as either a digital output (if digital information was stored), or it may be analog information (if analog information was stored).

While an example is provided of a line of 256 bits, a subline of 64 bits and two 32 bit portions thereof, the present invention is not limited to embodiments with any particular number of bits per line and portion of a line.

While an example in a wireless application is provided above, embodiments of the present invention may also be used in non-wireless applications as well.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   reading out the same portion of a memory line in the same cycle on two different buses.

2. The method of claim 1 including determining whether two read accesses are to the same portion of a memory line by determining whether the read accesses are to the same subline.

3. The method of claim 1 including using a modified Harvard architecture.

4. The method of claim 2 including providing a first portion of the subline on a first bus and a second portion of the subline on a second bus.

5. The method of claim 2 including determining that the read accesses are to the same half of a subline and providing that same half on two different output lines.

6. The method of claim 1 wherein determining includes comparing the addresses of two read accesses to determine whether those read accesses access the same subline.

7. The method of claim 6 including generating a read signal if those read accesses access the same subline.

8. The method of claim 7 including determining whether a 64 bit read has been enabled and, if so, accessing two different portions of the same subline in the same read cycle.

9. A processor comprising:
   a data memory; and
   a controller to access said data memory, said controller to read from the same portion of a memory line in the same cycle on two different buses.

10. The processor of claim 9 wherein said controller determines whether the read accesses are to the same subline.

11. The processor of claim 9 wherein said processor uses a modified Harvard architecture.

12. The processor of claim 10 wherein said controller to provide a first portion of the subline on a first bus and a second portion of the subline on a second bus.

13. The processor of claim 10 wherein said controller to determine that the read accesses are to the same half of a subline and provide that same half on two different output lines.

14. The processor of claim 9 wherein said controller to compare the addresses of two read accesses to determine whether said read accesses access the same subline.

15. The processor of claim 14 wherein said controller determines whether a 64 bit read has been enabled and, if so, accesses two different portions of the same subline in the same read cycle.

16. The processor of claim 14 wherein said controller includes a comparator coupled to an AND gate in turn coupled to said data memory.

17. A system comprising:
   a digital signal processor;
   a general purpose processor;
   a bus coupled to said digital signal processor and said general purpose processor; and
   said digital signal processor including a data memory and a controller to access the data memory, said controller to determine whether two reads are to the same portion of a memory line and, if so, read from the same portion in the same cycle on two different buses.

18. The system of claim 17 wherein said controller determines whether the read accesses are to the same subline.

19. The system of claim 18 wherein said digital signal processor uses a modified Harvard architecture.

20. The system of claim 18 wherein said controller to provide a first portion of said subline on a first bus and a second portion of said subline on a second bus.

21. The system of claim 18 wherein said controller to determine that the read accesses are to the same half subline and provide that same half on two different output lines.

22. The system of claim 18 wherein said controller to compare the addresses of two read accesses to determine whether said read accesses access the same subline.

23. An article comprising a medium storing instructions that, if executed, enable a processor-based system to:
   determine whether two read accesses are to the same portion of a memory line; and
   if so, read from the portion in the same cycle on two different buses.

24. The article of claim 23 further storing instructions that enable the processor-based system to determine whether the read accesses are to the same subline.

25. The article of claim 24 further storing instructions that enable a processor-based system to provide a first portion of the subline on a first bus and a second portion of the subline on a second bus.

26. The article of claim 24 further storing instructions that enable the processor-based system to determine that the read accesses are to the same half of a subline and provide that same half on two different output lines.

27. The article of claim 23 further storing instructions that enable the processor-based system to compare addresses to determine whether the read accesses access the same subline.

28. The article of claim 27 further storing instructions that enable the processor-based system to determine whether a 64 bit read has been enabled and, if so, access two different portions of the same subline in the same read cycle.

* * * * *